United States Patent Office 3,015,634
Patented Jan. 2, 1962

3,015,634
MINERAL FILLED POLYURETHANE FOAMS
Thomas H. Ferrigno, Metuchen, N.J., assignor to Minerals & Chemicals Philipp Corporation, a corporation of Maryland
No Drawing. Filed Apr. 15, 1959, Ser. No. 806,431
11 Claims. (Cl. 260—2.5)

The present invention relates to the class of polyurethane cellular plastics characterized by an open or inter-communicating cell structure.

One of the most outstanding advances in the plastics industry during the past decade has been the development of polyurethane foams which are cellular plastic materials formed by the the reaction of long chain polyol compounds and organic polyisocyanates. Cellular plastics are available in various degrees of rigidity, ranging from soft, flexible foams useful in cushioning, clothing interliners, rug underlays, sponges and bath mats; semirigid foams, useful particularly as crash pads; and rigid foams for structural and insulation purposes. The final properties of the urethane foams depend principally on the choice of polyester, polyethers, or other long chain polyhydroxyl compound which is converted by the polyisocyanate into a high molecular weight polymer which is then foamed by a suitable foaming system, usually by reaction of water with the free isocyanate content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl reactant, with the lower equivalent weight polyhydroxyl materials favoring the production of a closed cell structure and the higher equivalent weight polyhydroxyl materials leading to the open cell structure. The degree of branching of the polyhydroxyl reactant also influences the cell character.

The flexible and semirigid foams are processed for the aforementioned applications in a manner such that the foam has a low density, usually from about 1.25 to 4 pounds per cubic foot, and preferably as low a density as is consistent with the provision of a product of adequate strength, etc. Moreover, such flexible and semirigid foams should have an open celled structure for most applications, which is to say that essentially all (i.e., at least about 90%), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

Many advances have been made in the field of polyurethane chemistry with a view to improving processing techniques and the properties of the ultimate foamed product. Despite the refinements in processing reduced and cost of raw materials, a serious drawback to the use of polyurethane foams is their high cost which reflects particularly the expense of the polyisocyanate reactant. An obvious expedient for lowering the cost of polyurethane foamed products would be to extend the foam volume which is produced by a unit volume of prepolymer (or polyol and polyisocyanate ingredients) with low cost filler materials, such as are extensively used in other plastic applications. Such a filler, to truly extend the foam volume should increase the volume of foam produced by foaming a given volume of the prepolymer (or polyol-polyisocyanate ingredients) by an amount at least equal to the volume of foam produced by foaming an equivalent volume of prepolymer (or polyol-polyisocyanate ingredients) in the absence of the filler. Since foams are generally employed on a volume basis an increase in foam volume developed from a given amount of the costly polyisocyanate will decrease the cost of the foam required for a particular application. Moreover, the use of the filler should not adversely affect other physical properties, such as compression set, deflection, tear strength and cell structure.

The open cell flexible and semirigid foams are commercially prepared without fillers. Certain finely divided inorganic materials have been advocated for imparting special properties, such as shrink resistance, improved compression set and increased density to various types of polyurethane foams. However, in the case of the low density open celled polyurethane plastics, it has been found that most fillers adversely affect density and cell structure when incorporated in the foamable polyurethane composition in appreciable quantity, such as 10% by weight or more. For example, fine silica, viz., silica finer than 1 micron and particularly silica finer than 0.015 to 0.020 micron, is used in small quantities in the production of some low density polyurethane foam compositions for the purpose of improving the compression set or reducing shrinkage of the foamed product. However, greater quantities of such silica cannot be incorporated in the foam structure inasmuch as the resultant foam will be too dense and have poor texture. Similar effects are noticed when filler grades of other minerals are included in foamable polyurethane formulations. Thus, fine filler grades of kaolin clay markedly increase the density of the normally open celled low density polyurethane foam when incorporated therein in appreciable amount, and decrease the foam volume produced by a given volume of polyol and polyisocyanate. Also, fine grades of clay usually cause nonuniformity in the cell structure and loss of mechanical strength of the foam; in many cases, use of such clay, as well as other filler, causes complete or partial collapse of the foam. Thus, such kaolin clay fails to function as a foam extender.

Accordingly, an object of the present invention is to provide open celled mineral-extended flexible and semirigid polyurethane foam compositions which will overcome the aforementioned difficulties.

Another object of the invention is to provide open celled, low density polyurethane foam compositions containing kaolin clay as a filler therefor, which compositions possess characteristics such as: reduced cost, as a result of an increase in foam volume over that produced by a volume of polyurethane polymer equivalent to the volume of filler used; physical properties as good or better than the unfilled foam compositions; and excellent stability and compression characteristics.

A more specific object of the invention is the provision of excellent semirigid foams, which foams have properties superior to those of their unfilled counterpart and are particularly suitable for crash pads.

These and further objects and features of my invention will be readily apparent from the description thereof which follows:

I have discovered, in connection with the provision of lightweight, open celled foamed polyurethane plastics that important unexpected results are realized by utilizing, as the filler, fractionated kaolin clay of a relatively coarse critical particle size as hereafter set forth. My invention is of particular value in the provision of flexible or semirigid polyurethane foams.

Briefly stated, my invention contemplates the incorporation of fractionated kaolin clay in an open celled polyurethane foam, the kaolin clay being substantially free from particles coarser than 44 microns and being fractionated to a particle size distribution such that the content of material finer than 2 microns and finer than 0.55 micron is limited. The polymeric urethane plastic in which the kaolin clay is distributed is one formed by foaming the reaction product of a polyisocyanate and at least one long chain substantially linear polyhydroxyl compound in the presence of a catalyst, the polyhydroxyl compound being selected from those which normally (i.e., in the absence of the kaolin) produce an open celled cellular product when reacted with said polyisocyanate and employing a suitable foaming system.

I have found that the physical properties of normally open celled polyurethane plastics extended with the relatively coarse fractionated kaolin clay particles are as good, or in certain instances, superior to the properties of the unfilled foam. Moreover, the filled plastics represent a reduction in the cost of a unit volume of foamed urethane product in that the clay increases the foam volume developed from a given volume of liquid polyol and polyisocyanate reactants by an amount at least equal to the foam volume that would be developed by a volume of liquid polyol and polyisocyanate reactants equivalent to the volume of the clay used in the preparation of the product. In other words, the volume of the clay filled foamed plastic composition of my invention is at least equal to the sum of the volume of the foamed reaction product of the liquid polyol-polyisocyanate ingredients in the absence of the kaolin clay plus the foam volume produced in the absence of the clay by a volume of polyol-polyisocyanate ingredients equivalent to the volume of kaolin clay used in the formulation.

Microscopic studies of foams formulated with the coarse fractionated kaolin clay indicate a fine, uniform closed cell foam structure similar to that produced in the absence of the clay but characterized by somewhat thinner cell walls.

The particle size of the clay I employ is critical since whole kaolin clay or fractionated finer grades of kaolin clay are not satisfactory as fillers for such foamed plastics inasmuch as such clays fail to extend the foam volume and, in some instances cause collapse of the foam. This is surprising in view of the fact that it would be logical to expect that finer kaolin clays would be less likely to impair the open cell structure normally characteristic of such foams than the relatively coarse kaolin clay I employ.

Kaolin clay is a hydrous aluminosilicate of the approximate empirical formula $Al_2O_3 \cdot 2SiO_2 \cdot 2H_2O$ and is composed of the mineral kaolinite. Kaolin clay is not, however, limited to clays composed of the single mineral kaolinite since certain kaolin clays are composed of the minerals nacrite, dickite and anauxite, all of which are characterized by the formula given above. Halloysite, of which there are two varieties differing from each other in the amount of water of hydration, is also encompassed by the term "kaolin clay."

Mined kaolin clays are customarily refined for industrial usage by removing abrasive grit, as exemplified by material which is plus 325 mesh (44 microns). These refined clays frequently have particle size distributions such that usually 80% or 90% by weight, consists of particles under 2 microns in equivalent spherical diameter and the average equivalent spherical diameter (i.e., the equivalent spherical diameter of 50% by weight of the particles) is typically 0.55 micron or smaller.

The fractionated kaolin clay I use in filling cellular polyurethane plastics is produced from raw kaolin by substantially removing grit, i.e., material coarser than 44 microns, and separating from the degritted kaolin a sufficient quantity of the finer kaolin particles, by any of the numerous methods well-known to those skilled in the art, to provide a coarser degritted kaolin product having a particle size distribution such that substantially all is finer than about 44 microns, not more than 80% by weight consists of particles having an equivalent spherical diameter finer than 2 microns and not more than 35%, and preferably not more than 30% by weight consists of particles finer than 0.55 micron. Thus, the fractionated clay is a degritted clay having a particle size distribution such that at least 20% consists of particles larger than 2 microns and not more than 35% is finer than 0.55 micron. The average equivalent spherical diameter of the particles (i.e., the equivalent spherical diameter of 50% by weight of the particles) is usually between the range of 0.8 and 10.0 microns, and particularly good cellular products are prepared using a clay having an average equivalent spherical diameter between 0.8 and 4.8 microns. Kaolin clays finer than the relatively coarse fractionated clays I employ result in very dense or collapsed foams.

For the purpose of the present invention the particle size distribution of kaolin clay is determined by the Casagrande sedimentation method described in Journal of the American Ceramic Society, vol. 21, pages 89–97 (1938).

The amount of fractionated kaolin clay to be used in the foamed plastic may vary over a relatively wide range depending principally on the viscosity of the foamable polyurethane product in which it is incorporated and the method of foam preparation. In general, the clay is used in an amount of from about 5% to about 40% of the weight of the polyurethane polymer in the product and is more usually used in an amount between about 7.5% and 15%, same basis.

The long chain essentially linear polyol that is used in the polyurethane foam preparation is one that normally reacts with the polyisocyanate to produce an essentially linear reaction product which, in the presence of a catalyst, is capable of being foamed to provide an open celled low density cellular polyurethane product. In general, it may be said that suitable polyols have an equivalent weight of at least 200. The term "equivalent weight" as used herein is synonymous with the term "isocyanate equivalent" and is a theoretical value calculated from the hydroxyl and acid values of a polyol according to the formula:

$$\text{Equivalent weight} = \frac{56,100}{\text{Hydroxyl value} + \text{acid value}}$$

A preferred class of polyol, because of its low cost and low viscosity characteristics, is that of the so-called "polyethers" which are polyalkylene ether polyols, the reaction products of alkylene diamines, such as ethylene diamine, or polyhydroxyl compounds such as glycerine, with alkylene ethers such as ethylene oxides, propylene oxide or mixtures of propylene oxide and ethylene oxide. Such polyethers have a functionality of at least 2 and an equivalent weight of at least 200, and typically between 865 and 1333. As examples of suitable commercial polyethers may be cited: "Tetronic 701," a product of Wyandotte Chemical Company which is a condensation product of ethylene diamine and mixed propylene and ethylene oxides, having a functionality of 4 and an equivalent weight of 865; Pluronic L-61, also a product of Wyandotte Chemical Company, which is prepared from propylene glycol and mixed propylene and ethylene oxides and has a functionality of 2 and an equivalent weight of 1000; the polyglycol ether from glycerine and propylene oxide having a functionality of 3 and an equivalent weight of 1333, supplied under the trade designation "11–300" by the Dow Chemical Company, and PPG–2025, a product of Union Carbide Chemicals Company, Division of Union Carbide Corporation, which is a polypropylene glycol ether from propylene glycol and propylene oxide, having the functionality and equivalent weight of Pluronic L–61. Although I prefer to employ polyethers, because the low viscosity of polyether-polyisocyanate adducts is conducive to the realization of open celled urethane foams extended with relatively large quantities of coarse fractionated kaolin clay, other polyols may be used, particularly those which have a relatively low degree of branching, equivalent weights usually at least about 200, and are otherwise adapted to produce an open celled foam.

Another class of suitable polyhydroxyl compounds that may be used is that of saturated polyesters having terminal hydroxyl groups and low acid numbers (usually below 15); these polyesters are made from a dibasic acid, such as adipic acid, or succinic acid and a dihydric alcohol, such as ethylene glycol, or mixtures thereof. The resultant polyesters are liquids of moderate molecular weight, e.g., 1000 to 2500, terminate in hydroxyl groups and function chemically more or less as high molecular weight polyfunctional alcohols inasmuch as they have low acid numbers and are essentially free from unsaturation. Such polyesters are to be distinguished from the highly branched, viscous or solid polyesters derived essentially from triols and having low equivalent weights and used in producing rigid, closed celled foams. In addition to polyesters having terminal hydroxyl groups, fatty acid triglycerides having a hydroxyl number of at least 49, e.g., castor oil and derivatives thereof, may be employed, as described in U.S. Patent No. 2,787,601. Also useful are dihydroxy triglycerides, which have a lower functionality than the parent triglyceride and a higher equivalent weight, typically about 500–600. The triglycerides, particularly the trihydroxy triglycerides, are usually used in conjunction with the aforementioned polyethers or with polyols having a molecular weight below 200, as exemplified by ethylene glycol, trimethylolpropane and polyethyleneglycol. Obviously, polyols other than those specifically set forth above may be used provided that they normally are capable of forming an open celled foam with the polyisocyanate.

A large number of polyisocyanates may be used in the preparation of the cellular urethane products, although preferably the aromatic polyisocyanates, which are more reactive and less toxic than aliphatic polyisocyanates are used. At present 2,4-tolylene diisocyanate, 2,6-tolylene diisocyanate and mixtures thereof are commercially available. However, other diisocyanates may be used with good results when they are available, as examples of which may be cited methylene-bis(4-phenyl isocyanate), naphthalene 1,5-diisocyanate, and 3,3'-dimethoxy-4,4'-biphenylene diisocyanate.

As is well known to those skilled in the art, the isocyanate is employed in excess of that required to react with all functional groups in the polyol (and to react completely with water, when an aqueous foaming system is employed).

Various other materials may be included in the foam composition of my invention, as examples of which may be cited external plasticizers, such as di-esters, used to impart flexibility, coloring agents, emulsifiers and surface active agents. The latter class of materials encompass compounds of a wide variety of ionic character, surface activity, etc. It is well known that the cell size, water resistance, resistance to discoloration and chemicals, compression set, etc., may be controlled to a certain extent by the type and concentration of surfactant.

Any of the known methods for preparing low density open celled polyurethane cellular plastics may be employed in preparing kaolin clay extended cellular plastics of my invention. Such methods must be modified merely by providing for the uniform admixture of the kaolin clay particles in the diisocyanate-polyhydroxyl system prior to or simultaneously with the introduction of the catalyst and foaming system.

The practice of my invention will be described with particular reference to its adaptation to the well-known "prepolymer method," utilizing the familiar water foaming system.

The foamable polyurethane prepolymer I employ, in accordance with this form of the invention, is one that is normally a liquid and is preferably one that has as low a viscosity under ambient condition as is consistent with the provision of an ultimate foamed plastic of acceptable physical properties. The prepolymer contains free isocyanates in excess of that required to react with the hydroxyl groups of the polyol employed in the preparation of the prepolymer and with the water employed in the foaming step. The viscosity of the foamable liquid polyurethane prepolymer is between about 500 and 75,000 cp., although preferably the viscosity is between about 500 and 50,000 cp. Using more viscous prepolymers, it will be advantageous to heat the prepolymer to about 150° F. to about 180° F. to reduce its viscosity prior to adding the kaolin clay thereto. I have found that prepolymers having a viscosity greater than about 75,000 may not be filled with adequate quantities of the fractionated kaolin clay to influence favorably the cost of the finished product whereas the physical properties of the ultimate foam may be impaired if the viscosity of the prepolymer is lower than about 500 cp. All viscosity values refer to determinations made at 25° C.

Suitable polyurethane polymers are the reaction products of long chain polyols (hereinabove described) and polyisocyanates, as exemplified by the reaction product of an arylene diisocyanate and a polyalkylene ether polyol, the reaction product of an arylene diisocyanate and a saturated polyester resin containing terminal hydroxyl groups, and the reaction product of an arylene diisocyanate and a fatty acid triglyceride having an hydroxyl number of at least 49. All of the aforementioned polyurethane prepolymers are well-known to those skilled in the art and their preparation is amply described in the literature. The preparation of the reaction products of arylene diisocyanates and polyalkylene ether polyols, which are particularly useful prepolymers in the practice of my invention because of their low viscosity, is described in Technical Data Sheet 11058, National Aniline Division, Allied Chemical & Dye Corporation. Triglycerides having a hydroxyl number of at least 49, e.g., castor oil, may be reacted with arylene diisocyanates, as described in U.S. 2,787,601 to form a suitable liquid polyurethane prepolymer. The ratio of triglyceride hydroxyl groups to isocyanate groups in such polyurethane products is from 0.45:2 to 0.95:2. Other liquid polyurethane compositions containing free isocyanate groups and which are capable of producing a plastic foam upon reaction with water may be used.

The isocyanate content of the prepolymer is controlled so as to provide more —NCO groups than theoretically required for complete reaction with all water and all functional groups in the polyol. The free —NCO content of the prepolymer is about 5% to 20%, based on the weight of the prepolymer and is usually about 9.0%. The excess isocyanate groups, which are at the end of the polyurethane chains after the water added to the prepolymer is consumed, can then react with active hydrogen groups, such as urea, urethane, hydroxyl or amide groups within the polymer chain so as to branch linear chains or crosslink branched chains in order that optimum physical properties of the foam may be developed.

The number of free or unreacted isocyanate groups in the polyurethane prepolymer may be determined by adding an excess of n-butylamine and back titrating excess amine with hydrochloric acid.

The amount of water added to the polyurethane prepolymer containing unreacted isocyanate groups to expand the polymer into a cellular plastic will vary with the properties sought in the foamed plastic and is usually within the range of from about 33% to about 95% of the unreacted isocyanate radicals in the polyurethane prepolymer.

Other materials may be added during the formation of the plastic foam from the polyurethane prepolymer to control, for example, the reaction rate and viscosity build-up during reaction. A tertiary amine catalyst, such as for example, pyridine, triethylene diamine, dimethylhexadecylamine, quinoline, triethylamine or N-methylmorpholine, is employed to accelerate the reaction between the water and isocyanate groups of the prepolymer, as well as to induce crosslinking by reaction of excess isocyanate groups with substituents of the polyurethane. However, other catalyst systems may be employed within the scope of my invention. For example, I may use a combination of a tertiary amine with an organic tin product, such as dibutyl tin dilaurate, dibutyl tin oxide. The tin organic has also been found to be effective in the absence of tertiary amine catalysts.

It will be distinctly understood that methods other than the so-called "prepolymer method" may be employed in the preparation of the kaolin clay extended open celled foams. All of these methods involve the reaction of an arylene diisocyanate with a long chain linear polyol to form a foamable polyurethane which contains unreacted —NCO groups, and foaming the arylene diisocyanate-polyol adduct in the presence of a catalyst. For example, the isocyanate may be reacted with a portion only of the polyol to provide a polymer having a relatively high —NCO content, e.g., about 30%; the kaolin may be added thereto followed by addition of a mixture of remaining polyol, catalyst, water and surface active agent. In such a case, the total quantity of polyol will be such as to provide about a 9% free isocyanate content in the mixture. Alternatively, the so-called "one shot" method may be employed; in accordance with this mthod, the clay may be added to the polyol and a mixture of polyisocyanate, water and catalyst (organo-tin derivative) rapidly added thereto. Likewise, other foaming systems may be employed. For example, a metal salt hydrate may be employed in lieu of or in conjunction with water. Also, a solvent foaming system, a recent innovation in the polyurethane foam art, may be used. Pursuant to the latter, the polyurethane prepolymer is dissolved in a solvent which has a boiling point just above room temperature at atmospheric pressure. Catalyst is added and the heat of reaction causes the solvent to vaporize; as the polymeric structure builds up, the solvent volatilizes thereby foaming the polymer. A smaller quantity of polyisocyanate is employed in the production of such a composition than when water is employed in the foaming step.

Following are examples which illustrate the superiority of fractionated kaolin of the size range specified over other materials used as fillers in polyurethane foams. It will be clearly understood that the invention is not limited to the particular polyol and diisocyanate reactants and quantities mentioned in these examples, in which all parts are by weight.

EXAMPLE I

(1) Preparation of polyurethane prepolymer

In this example the polyol employed in preparing the polyurethane prepolymer was Niax Diol PPG–2025, which is a linear polypropylene oxide glycol having a molecular weight of 2000, an hydroxyl number of 56 and weighing 8.75 pounds per gallon.

2200 parts of the polyether was mixed thoroughly and rapidly with 200.2 parts of 2,4-tolylene diisocyanate (1.05 equivalents per equivalent of polyether) under a dry nitrogen blanket in a stainless steel vessel, resulting in an exothermic reaction. The temperature increased to 158° F. after one hour and was maintained at about 2¾ hours at which time viscosity was 1,500 cp. (as measured at 25° C. on a Brookfield viscometer using the #5 spindle). 539 parts of 2,4-tolylene diisocyanate was added to bring the final —NCO content of the prepolymer to 9% over a period of about an hour holding the temperature at about 158° F. The batch was then poured in cans which were flushed with dry nitrogen gas and sealed.

(2) Preparation of foams

The prepolymer was mixed with polydimethyl siloxane liquid (a wetting agent supplied by Dow Corning Corporation under the designation DC 200), using 100 parts of prepolymer to 0.5 part siloxane. Various kaolin clays were added to fractions of the prepolymer, using 10 parts of clay for each 100 parts of prepolymer, and mixed into the prepolymer for 3 minutes under high speed agitation.

To each fraction containing 10 parts kaolin clay, 100 parts prepolymer and 0.5 part siloxane, a mixture of 2.0 parts N-methylmorpholine and 2.3 parts water was rapidly added and the batch agitated vigorously for 10 seconds and then immediately poured into a closed mold lined with polyethylene film. 15 minutes after the foams reached peak height, the foam and form were placed in a forced draft oven at 158° C. for 15 minutes and the forms removed. All foams were post cured for 4 hours at 176° F.

Following is the particle size distribution of various kaolin clays employed in this example and other examples of my invention.

| | Percent by weight finer than— | | | | |
|---|---|---|---|---|---|
| | 35 microns | 4.8 microns | 2 microns | 1 micron | 0.55 micron |
| ASP 200 | 100 | 100 | 92 | 72 | 50 |
| ASP 600 | 100 | 98 | 80 | 55 | 30 |
| ASP 900 | 100 | 80 | 55 | 37 | 15 |
| ASP 400 | 100 | 50 | 22 | 10 | 7 |

All of these clays were degritted; the maximum 325 mesh content of ASP 200 was 0.02%; ASP 400 and 900, 0.15%; ASP 600, 0.015%. ASP 200, etc., are the trade names of various grades of water-washed kaolin clay.

The percent by weight of these clays lying within certain size ranges is given below:

| Particle size distribution, percent by weight | ASP 200 | ASP 600 | ASP 900 | ASP 400 |
|---|---|---|---|---|
| 0–½ micron | 44 | 30 | 20 | 4 |
| ½–1 micron | 28 | 26 | 21 | 6 |
| 1–2 microns | 20 | 23 | 17 | 10 |
| 2–5 microns | 8 | 18 | 23 | 31 |
| 5–10 microns | 0 | 3 | 12 | 30 |
| 10–35 microns | 0 | 0 | 7 | 19 |
| Avg. equivalent spherical diameter, micron | 0.55 | 0.8 | 1.5 | 4.8 |

The density of these clays is 21.5 pounds per gallon; maximum free moisture content was 0.5% (free moisture is the weight percentage of the clay eliminated by heating essentially to constant weight at about 220° F.).

In Table I there is recorded the physical properties of the foamed resins formulated as above-described with the various grades of kaolin clay described above.

Densities were determined by weighing blocks carefully cut to 2 x 2 x 1 inch. These blocks were then used in the 50% deflection and percent compression set tests. The compression set test was conducted in accordance with ASTM test D–1564–58, method B, constant deflection. This value represents the percent of the original height of the sample which did not recover in 30 minutes after the sample had been compressed to half its original height for a period of 22 hours at 158° F. The higher values indicate poor resiliency characteristics or loss of resiliency upon aging. The 50% deflection test was conducted by loading a balanced board and tin can on the 2 x 2 x 1 inch specimen and filling the can with bird shot until the one-inch dimension was reduced to ½ inch and remained at this height for 1 minute. The total load was determined and reported as pounds per square inch per 50% deflection.

The data representing foam volume in cubic feet was derived by dividing the total batch weight, in pounds, including that of the extender, by the density of the cured foam. If an increase of foam volume was realized, the effect was due to the extender. It has been mentioned that a filler to be truly an extender for a foamed resin must increase the foam volume developed from a given volume of prepolymer by an amount at least equal to the volume of foam produced by an equivalent volume of prepolymer in the absence of the filler. Thus, for example, if 100 pounds of an unfilled prepolymer weighing 8.75 pounds per gallon yields 2.57 cubic feet of foam per gallon of prepolymer (or 100 pounds of prepolymer yields a total foam volume of 30.4 cubic feet), then addition of 10 pounds of a mineral filler having a density of 21.5 pounds per gallon and occupying 0.465 gallon, should increase the foam yielded by 100 pounds of the same prepolymer by (2.57 x 0.465) or about 1.20 cubic feet.

TABLE I

| Filler | Physical properties of flexible foams | | | | |
|---|---|---|---|---|---|
| | Avg. equiv. spherical diam. of filler, microns | Density lbs./cu. ft. | Foam vol., cu. ft./total formula | P.s.i./50% deflection | Percent compression |
| None (control) | | 3.29 | 30.4 | 0.50 | 29.5 |
| APS 200 | 0.55 | 16.7 | 6.6 | | |
| ASP 600 | 0.80 | 3.44 | 32.0 | 0.66 | 22.8 |
| ASP 400 | 4.8 | 3.39 | 32.4 | 0.65 | 21.1 |

The data reported in Table I shows that the fine kaolin clay (ASP 200) was unsuitable as a filler in the polyurethane foam in that it increased the density of the foam almost five-fold over that of the control foam which was formulated without an extender, and very markedly decreased the foam volume from that normally produced by a given volume of prepolymer. On the other hand, the coarser kaolin clays, viz., ASP 600 and ASP 400, all increased the foam volume produced by the prepolymer by more than the same volume of prepolymer would, with particularly good results in this respect being realized with the ASP 400, which was the coarsest grade of clay employed. The use of all of the coarser grades of kaolin improved the compression set characteristics of the foam, thus indicating improved resilience of the foam. An inspection of the deflection data appearing in Table I indicated that the coarse kaolin clays I employ increased the rigidity of the foams so as to improve their utility in crash pads and other applications in which a rather rigid foam is required to realize the requisite degree of shock absorbency. By increasing the deflection value of the foam, the shock absorption of a unit volume of foam is increased or a thinner section of foam will have shock absorbency comparable to thicker sections of less rigid foams.

EXAMPLE II

Other extenders were employed with the prepolymer of Example I and the characteristics of the resultant polyurethane foams studied. The extenders were used in the amount 10 parts by weight per 100 parts by weight of prepolymer and the foam produced as described under Example I.

The extenders investigated were as follows: Satintone Special, a calcined kaolin clay having an average equivalent spherical diameter of 1.2 microns, and supplied by Minerals & Chemicals Corporation of America; Nytal 400, a micronized talc, having an average equivalent spherical diameter of 1.5 microns, supplied by R. T. Vanderbilt Co., Inc.; Cabosil, a silica aerogel, produced by Godfrey L. Cabot, Inc., having an average equivalent spherical diameter of 0.015 micron. The densities and foam volumes of the formulations prepared with each of the aforementioned extenders are reported in Table II, along with the deflection and compression set values.

TABLE II

| Extender | Density lbs./cu. ft. | Foam vol., cu. ft./total formula | P.s.i./50% deflection | Percent compression set |
|---|---|---|---|---|
| Calcined kaolin 1.2 microns | 7.24 | 15.2 | | |
| Micronized talc | 3.89 | 28.3 | 0.58 | 25.0 |
| Silica aerogel | No foam | | | |
| None (control) | 3.30 | 30.3 | 0.50 | 35.4 |

None of these extenders extended the volume of the foam. The fine calcined kaolin decreased the normal foam volume and the aerogel prevented foam formation.

EXAMPLE III

The effect of various kaolin extenders was examined in the same prepolymer system employed in Example I and foamed with a 2.6:2 water-catalyst weight ratio. The foam characteristics of the various foams formulated with 10 parts by weight extender per 100 parts by weight prepolymer are evaluated in Table III which follows. Also evaluated was another clay type, Georgia-Florida fuller's earth, known as attapulgite clay. The attapulgite was Attasorb LVM, a calcined grade supplied by Minerals & Chemicals Corporation of America, and having a free moisture content of 2%.

TABLE III

| Extender | Density lbs./cu. ft. | Foam vol., cu. ft./total formula | P.s.i./50% deflection | Percent compression set |
|---|---|---|---|---|
| None | 3.31 | 30.2 | 0.55 | 25.5 |
| ASP 200 | (1) | | | |
| ASP 900 | 3.49 | 31.5 | 0.61 | 26.1 |
| Attasorb LVM | 3.82 | 28.8 | | |

[1] Foam collapsed.

The fine kaolin was completely unsuitable as a filler since the foam collapsed. However, the use of the coarser kaolin, ASP 900, resulted in an excellent extended foam with compression characteristics similar to that of the unextended foams although somewhat more rigid. The attapulgite clay failed to extend to the foam volume.

EXAMPLE IV

The stability of mineral filled polyurethane prepolymers was investigated to determine which extenders could be mixed in the prepolymer without unduly increasing its viscosity upon initial incorporation or on aging.

The prepolymer was based on the polyether employed in Example I and was prepared by agitating at high speed 2200 parts of polyether and 233.2 parts 2,4-tolylene diisocyanate under a blanket of dry nitrogen and holding the mixture at 154° F. to 160° F. for 3½ hours at which time the apparent Brookfield viscosity was 1700 cp. A second charge of diisocyanate in the amount of 664.4 grams was added to the mixture over a period of about 35 minutes and the batch was held at about 158° F. for an additional 15 minutes, poured in cans flushed with dry nitrogen and sealed. The viscosity of the finished prepolymer was 1680 cp.

Various extenders were added to samples of the prepolymer in the amount of 10 parts per 100 parts of prepolymer by mixing the extender into prepolymer for 3 minutes with high speed agitation. Extenders used were ASP 400 (coarse fractionated kaolin) and ASP 200 (fine kaolin).

Brookfield viscosities of the extender filled prepolymers were taken immediately after formulations and after aging 3 days, using the #5 spindle at 50 r.p.m. The control sample was mixed for 3 minutes before recording initial viscosity. The results are given below in Table IV.

TABLE IV

| Extender | Brookfield viscosity, cp. | | | |
| --- | --- | --- | --- | --- |
| | Initial | | After aging 3 days | |
| | 20 r.p.m. | 50 r.p.m. | 20 r.p.m. | 50 r.p.m. |
| None | 1,520 | 1,560 | 2,340 | 2,512 |
| ASP 200 | 2,120 | 2,180 | 5,500 | 5,080 |
| ASP 400 | 1,900 | 1,920 | 3,600 | 3,760 |

The prepolymer filled with the coarse kaolin, ASP 400, was visually uniform after aging 3 days and, as shown in the results tabulated in Table IV, did not increase the viscosity of either initial or aged prepolymer system to nearly the extent that the fine kaolin, ASP 200, increased the viscosity. Moreover, the ASP 200 filled prepolymer skinned after aging, indicating poor stability.

EXAMPLE V

This example illustrates the preparation of a kaolin filled foamed polyurethane product using castor oil as a reactant.

A prepolymer is prepared as follows:

Parts by weight
Nacconate 80 _____ 1,300
Castor oil (grade Cp, Spencer Kellogg & Sons,
  Inc.) _____ 1,800

Both ingredients are mixed in the reaction vessel. When the temperature reaches 185° F., heating is begun and the batch brought to 275° F., continuous agitation being employed throughout the processing. The temperature is held at 275° F. for about one hour at the end of which time the viscosity of the prepolymer should be 40,000 to 70,000 cp. at room temperature.

To 100 parts of prepolymer, 15 parts of ASP 400 are carefully mixed in to avoid entrainment of air. A catalyst-water wetting agent mixture is prepared by mixing:

Parts by weight
Water _____ 100
Dimethylethanolamine _____ 45
Triton X100 (alkyl aryl ether alcohol) _____ 65

The prepolymer-ASP 400 mixture is warmed to 150° F. to reduce viscosity and to facilitate rapid mixing therein of 7.5 parts of the above catalyst mixture. After introduction of the catalyst mixture, the batch is vigorously agitated for 10 seconds and poured into a mold to foam. The resulting foam is a semirigid type.

EXAMPLE VI

This example illustrates the superiority of coarse fractionated kaolin clay to fine kaolin clay as a filler in an open celled polyurethane foam composition made by the so-called "one-shot" method. The polyether was Niax Diol PPG 2205 which was used in Example I and the polyisocyanate was Nacconate 80, a mixture of 2,4-tolylene diisocyanate and 2,6-tolylene diisocyanate (National Aniline Division, Allied Chemical & Dye Corporation).

Foams were prepared by mixing 75 parts by weight of polyether with a catalyst mixture consisting of 2.18 parts by weight water, 0.53 part by weight triethylene diamine and 0.53 part by weight of the silicone fluid used in Example I. Clay, when used, was added at this point in amount of 30 parts by weight, until an even distribution of filler in the polyether-catalyst mixture was obtained; 27.8 parts by weight of the diisocyanate was added to this mix and stirred until well dispersed and incipient foaming was observable.

The mix was then poured into 6 x 6 x 6 aluminum foil molds and allowed to foam. The results tabulated below in Table V show the superiority of the coarse kaolin (ASP 400) to the fine kaolin (ASP 100).

TABLE V

| Extender | Density lbs./cu. ft. | Foam volume cu. ft./total formula | Percent compression set |
| --- | --- | --- | --- |
| None | 2.99 | 34.4 | 9.8 |
| ASP 200 | (¹) | | |
| ASP 400 | 3.67 | 40.3 | 11.0 |

¹ Foam cracked with clay segregated.

I claim:

1. A composition comprising an open celled plastic foam which is the reaction product of at least one liquid long chain polyol and an excess of an arylene diisocyanate which has been foamed by incorporation of water and catalyst therein, said polyol being selected from the group consisting of a linear polyalkylene ether polyol having an equivalent weight of at least 200, a fatty acid triglyceride having an hydroxyl number of at least 49 and a linear saturated polyester having terminal hydroxyl groups which is the esterification product of a dibasic acid and a dihydric alcohol, and uniformly distributed throughout the walls of said open celled foamed plastic from about 5% to about 40%, based on the weight of said foamed reaction product, of kaolin clay, said kaolin clay being substantially free from particles coarser than 44 microns and having a particle size distribution such that not over 80% by weight consists of particles finer than 2 microns in equivalent spherical diameter and not more than 35% by weight consists of particles finer than 0.55 micron.

2. The composition of claim 1 wherein said kaolin clay particles have an average equivalent spherical diameter within the range of 0.8 to 4.8 microns.

3. A composition comprising an open celled plastic foam which is the reaction product of at least one liquid long chain polyol and an excess of an arylene diisocyanate which has been foamed by incorporation of water and catalyst therein, said polyol being selected from the group consisting of a linear polyalkylene ether polyol having an equivalent weight of at least 200, a fatty acid triglyceride having an hydroxyl number of at least 49 and a linear saturated polyester having terminal hydroxyl groups which is the esterification product of a dibasic acid and a dihydric alcohol, and uniformly distributed throughout the walls of said open celled foamed plastic from about 5% to about 40%, based on the weight of said foamed reaction product, of kaolin clay, said kaolin clay being substantially free from particles coarser than 44 microns and having a particle size distribution such that not over 80% by weight consists of particles finer than 2 microns in equivalent spherical diameter and not more than 35% by weight consists of particles finer than 0.55 micron, said composition being further characterized by having a foam volume at least equal to the sum of the volume of a foamed reaction product of said polyol and said arylene diisocyanate in the absence of said kaolin clay plus the volume of foam which would normally be produced in the absence of said kaolin clay by a volume of polyol and arylene diisocyanate equivalent to the volume of said kaolin clay in said composition.

4. The composition of claim 3 in which said kaolin clay has a particle size distribution such that about 50% by weight consists of particles finer than 4.8 microns, about 22% by weight consists of particles finer than 2 microns, and about 10% by weight consists of particles finer than 1 micron.

5. The composition of claim 3 in which said kaolin clay has a particle size distribution such that about 80% by weight consists of particles finer than 4.8 microns, about 55% by weight consists of particles finer than 2 microns, and about 37% by weight consists of particles finer than 1 micron.

6. The composition of claim 3 in which said kaolin clay has a particle size distribution such that about 98% by weight consists of particles finer than 4.8 microns, about 80% by weight consists of particles finer than 2 microns, about 55% by weight consists of particles finer than 1 micron, and about 30% by weight consists of particles finer than 0.55 micron.

7. A composition comprising the open celled plastic foam which is obtained by incorporating water and a tertiary amine catalyst into the reaction product of a liquid linear polyalkylene ether polyol having an equivalent weight of at least 200 with an excess of an arylene diisocyanate, and uniformly distributed throughout the walls of said plastic foam from about 5% to 40% by weight of kaolin clay, said kaolin clay being substantially free from particles coarser than 44 microns and having a particle size distribution such that not over 80% by weight consists of particles finer than 2 microns in equivalent spherical diameter and not more than 35% by weight consists of particles finer than 0.55 micron.

8. A composition comprising the open celled plastic foam which is obtained by incorporating water and a tertiary amine catalyst into the reaction product of a liquid linear polyalkylene ether polyol having an equivalent weight of at least 200 with an excess of an arylene diisocyanate, and uniformly distributed throughout the walls of said plastic foam from about 5% to 40% by weight of kaolin clay, said kaolin clay being substantially free from particles coarser than 44 microns and having a particle size distribution such that not over 80% by weight consists of particles finer than 2 microns in equivalent spherical diameter and not more than 35% by weight consists of particles finer than 0.55 micron, said composition being further characterized by having a foam volume at least equal to the sum of the volume of a foamed reaction product of said polyalkylene ether polyol and said arylene diisocyanate in the absence of said kaolin clay plus the volume of foam which would normally be produced in the absence of said kaolin clay by a volume of said polyalkylene ether polyol and said arylene diisocyanate equivalent to the volume of said kaolin clay in said composition.

9. The composition of claim 8 in which said kaolin clay has a particle size distribution such that about 50% by weight consists of particles finer than 4.8 microns, about 22% by weight consists of particles finer than 2 microns, and about 10% by weight consists of particles finer than 1 micron.

10. The composition of claim 8 in which said kaolin clay has a particle size distribution such that about 80% by weight consists of particles finer than 4.8 microns, about 55% by weight consists of particles finer than 2 microns, and about 37% by weight consists of particles finer than 1 micron.

11. The composition of claim 8 in which said kaolin clay has a particle size distribution such that about 98% by weight consists of particles finer than 4.8 microns, about 80% by weight consists of particles finer than 2 microns, about 55% by weight consists of particles finer than 1 micron, and about 30% by weight consists of particles finer than 0.55 micron.

References Cited in the file of this patent

UNITED STATES PATENTS

| | | |
|---|---|---|
| 2,642,403 | Simon et al. | June 16, 1953 |
| 2,740,743 | Pace | Apr. 3, 1956 |
| 2,842,506 | Roussel | July 8, 1958 |
| 2,915,475 | Bugosh | Dec. 1, 1959 |

FOREIGN PATENTS

| | | |
|---|---|---|
| 745,960 | Great Britain | Mar. 7, 1956 |
| 788,062 | Great Britain | Dec. 23, 1957 |

UNITED STATES PATENT OFFICE
CERTIFICATE OF CORRECTION

Patent No. 3,015,634 January 2, 1962

Thomas H. Ferrigno

It is hereby certified that error appears in the above numbered patent requiring correction and that the said Letters Patent should read as corrected below.

Column 1, lines 60 and 61, for "processing reduced and" read -- processing and reduced --.

Signed and sealed this 11th day of September 1962.

(SEAL)
Attest:

ERNEST W. SWIDER
Attesting Officer

DAVID L. LADD
Commissioner of Patents